US012581093B2

(12) United States Patent
Kang et al.

(10) Patent No.: US 12,581,093 B2
(45) Date of Patent: Mar. 17, 2026

(54) METHOD AND APPARATUS FOR VIDEO CODING USING AN IMPROVED IN-LOOP FILTER

(71) Applicants: HYUNDAI MOTOR COMPANY, Seoul (KR); KIA CORPORATION, Seoul (KR); EWHA UNIVERSITY—INDUSTRY COLLABORATION FOUNDATION, Seoul (KR)

(72) Inventors: Je Won Kang, Seoul (KR); Jung Kyung Lee, Seoul (KR); Seung Wook Park, Yongin-si (KR); Jin Heo, Yongin-si (KR)

(73) Assignees: HYUNDAI MOTOR COMPANY, Seoul (KR); KIA CORPORATION, Seoul (KR); ETHAN UNIVERSITY—INDUSTRY COLLABORATION FOUNDATION, Seoul (KR)

( * ) Notice: Subject to any disclaimer, the term of this patent is extended or adjusted under 35 U.S.C. 154(b) by 46 days.

(21) Appl. No.: 18/426,793

(22) Filed: Jan. 30, 2024

(65) Prior Publication Data

US 2024/0179324 A1 May 30, 2024

Related U.S. Application Data

(63) Continuation of application No. PCT/KR2022/010603, filed on Jul. 20, 2022.

(30) Foreign Application Priority Data

Aug. 17, 2021 (KR) ........................ 10-2021-0108041
Jul. 19, 2022 (KR) ........................ 10-2022-0089020

(51) Int. Cl.
*H04N 7/12* (2006.01)
*H04N 19/154* (2014.01)
(Continued)

(52) U.S. Cl.
CPC ......... *H04N 19/154* (2014.11); *H04N 19/172* (2014.11); *H04N 19/46* (2014.11)

(58) Field of Classification Search
CPC .... H04N 19/154; H04N 19/172; H04N 19/46; H04N 19/117; H04N 19/423;
(Continued)

(56) References Cited

U.S. PATENT DOCUMENTS 9,124,887 B2 9/2015 Lim
9,374,587 B2 6/2016 Lim
(Continued)

FOREIGN PATENT DOCUMENTS

KR 101743482 B1 6/2017
KR 101974261 B1 4/2019
(Continued)

OTHER PUBLICATIONS

International Search Report and Written Opinion cited in corresponding international patent application No. PCT/KR2022/010603 ; Nov. 10, 2022; 10 pp.

*Primary Examiner* — Gims S Philippe
(74) *Attorney, Agent, or Firm* — Lempia Summerfield Katz LLC

(57) ABSTRACT

A method and an apparatus are disclosed for video coding using an improved in-loop filter. The video coding method and the apparatus generate a residual frame from a reconstructed frame using a deep learning model. The video coding method and the apparatus improve performance of an in-loop filter by approximating an original residual frame by applying the generated residual frame to a linear model.

19 Claims, 11 Drawing Sheets

(51) Int. Cl.
　　　*H04N 19/172*　　　(2014.01)
　　　*H04N 19/46*　　　(2014.01)

(58) Field of Classification Search
　　　CPC ...... H04N 19/597; H04N 19/70; H04N 19/82;
　　　　　　　　H04N 19/86; G06T 3/40; G06T 9/00
　　　See application file for complete search history.

(56) References Cited

U.S. PATENT DOCUMENTS

| | | | |
|---|---|---|---|
| 9,386,314 B2 | 7/2016 | Lim | |
| 9,386,315 B2 | 7/2016 | Lim | |
| 9,414,071 B2 | 8/2016 | Lim | |
| 10,621,697 B2 | 4/2020 | Chou | |
| 11,095,887 B2 | 8/2021 | Kim | |
| 11,627,316 B2 | 4/2023 | Kim | |
| 12,034,964 B2 * | 7/2024 | Liu | H04N 19/139 |
| 2013/0028529 A1 | 1/2013 | Lim | |
| 2015/0319433 A1 | 11/2015 | Lim | |
| 2015/0319434 A1 | 11/2015 | Lim | |
| 2015/0319435 A1 | 11/2015 | Lim | |
| 2015/0319436 A1 | 11/2015 | Lim | |
| 2018/0176576 A1 * | 6/2018 | Rippel | G06N 3/08 |
| 2019/0045192 A1 * | 2/2019 | Socek | H04N 19/573 |
| 2019/0230354 A1 | 7/2019 | Kim | |
| 2020/0213587 A1 | 7/2020 | Galpin | |
| 2021/0344916 A1 | 11/2021 | Kim | |
| 2022/0210402 A1 * | 6/2022 | Li | H04N 19/577 |
| 2022/0239911 A1 * | 7/2022 | Zhu | H04N 19/176 |
| 2023/0134212 A1 | 5/2023 | Kim | |
| 2024/0031580 A1 * | 1/2024 | Kang | H04N 19/513 |
| 2024/0267531 A1 * | 8/2024 | Kalva | H04N 19/42 |

FOREIGN PATENT DOCUMENTS

| | | | |
|---|---|---|---|
| KR | 20200040773 A | 4/2020 | |
| KR | 20200095589 A | 8/2020 | |

* cited by examiner

0 : Planar
1 : DC

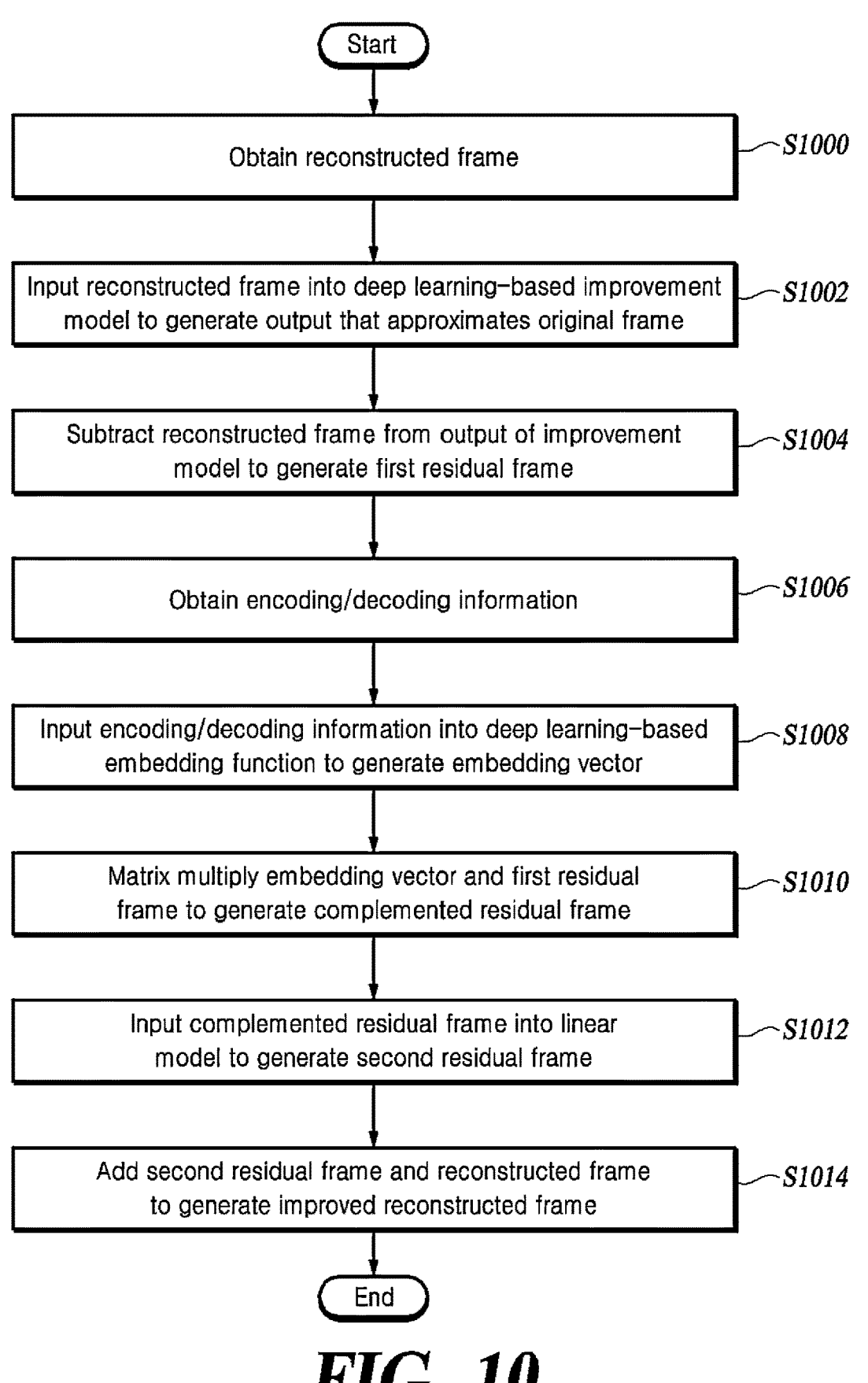

Start

Obtain reconstructed frame — S1000

Input reconstructed frame into deep learning–based improvement model to generate output that approximates original frame — S1002

Subtract reconstructed frame from output of improvement model to generate first residual frame — S1004

Obtain encoding/decoding information — S1006

Input encoding/decoding information into deep learning–based embedding function to generate embedding vector — S1008

Matrix multiply embedding vector and first residual frame to generate complemented residual frame — S1010

Input complemented residual frame into linear model to generate second residual frame — S1012

Add second residual frame and reconstructed frame to generate improved reconstructed frame — S1014

End

*FIG. 10*

METHOD AND APPARATUS FOR VIDEO CODING USING AN IMPROVED IN-LOOP FILTER

CROSS-REFERENCE TO RELATED APPLICATIONS

This application is a continuation of International Application No. PCT/KR2022/010603, filed on Jul. 20, 2022, which claims priority to and the benefit of Korean Patent Application No. 10-2021-0108041, filed on Aug. 17, 2021, and Korean Patent Application No. 10-2022-0089020, filed on Jul. 19, 2022, the entire disclosures of each of which are incorporated herein by reference.

TECHNICAL FIELD

The present disclosure relates to a video coding method and an apparatus using an improved in-loop filter.

BACKGROUND

The statements in this section merely provide background information related to the present disclosure and do not necessarily constitute prior art.

Since video data has a large amount of data compared to audio or still image data, the video data requires a lot of hardware resources, including memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

A general video quality improvement algorithm based on deep learning technology seeks to improve video quality and reduce the amount of computation by using residual signals according to a skip path. In addition, deep learning-based image processing technology has been applied to existing coding element technology. Among existing coding technologies, coding efficiency may be improved by applying deep learning-based image processing technology to compression technologies, such as inter prediction, intra prediction, in-loop filter, and transform. Representative application examples include inter prediction based on a virtual reference frame generated based on a deep learning model and in-loop filter based on a reconstructed frame. Therefore, in video encoding/decoding, the application of deep learning-based image processing technology using residual signals needs to be considered to improve coding efficiency and video quality.

SUMMARY

The present disclosure seeks to provide a video coding method and an apparatus for generating a residual frame from a reconstructed frame using a deep learning model to improve video coding efficiency and video quality. The video coding method and the apparatus improve performance of an in-loop filter by approximating an original residual frame by applying the generated residual frame to a linear model.

At least one aspect of the present disclosure provides a method for improving video quality of a reconstructed frame, performed by a computing device. The method includes obtaining the reconstructed frame and inputting the reconstructed frame into a deep learning-based improvement model to generate an output that approximates an original frame. Here, the reconstructed frame is a frame obtained by reconstructing the original frame and reconstructed in advance by the computing device. The method also includes generating a first residual frame by subtracting the reconstructed frame from an output of the deep learning-based improvement model. The method also includes inputting the first residual frame into a linear model to generate a second residual frame. Here, the linear model includes parameters representing a linear relation between the first residual frame and the second residual frame. The method also includes generating an improved reconstructed frame by adding the second residual frame and the reconstructed frame.

Another aspect of the present disclosure provides a video quality improvement device included in a video decoding apparatus. The video quality improvement device includes a first improver including a deep learning-based improvement model. The first improver is configured to obtain a reconstructed frame and input the reconstructed frame into the deep learning-based improvement model to generate an output that approximates an original frame. Here, the reconstructed frame is a frame obtained by reconstructing the original frame and reconstructed in advance by the video decoding apparatus. The video quality improvement device also includes a subtractor configured to subtract the reconstructed frame from an output of the improvement model to generate a first residual frame. The video quality improvement device also includes a second improver including a linear model. The second improver is configured to input the first residual frame into the linear model to generate a second residual frame. Here, the linear model includes parameters representing a linear relation between the first residual frame and the second residual frame. The video quality improvement device also includes an adder configured to add the second residual frame and the reconstructed frame to generate an improved reconstructed frame.

Yet another aspect of the present disclosure provides a method for improving video quality of a reconstructed frame, performed by a computing device. The method includes obtaining the reconstructed frame and inputting the reconstructed frame into a deep learning-based improvement model to generate an output that approximates an original frame. Here, the reconstructed frame is a frame obtained by reconstructing the original frame and reconstructed in advance by the computing device. The method also includes generating a first residual frame by subtracting the reconstructed frame from the output of the deep learning-based improvement model. The method also includes obtaining encoding/decoding information and inputting the encoding/decoding information into a deep learning-based embedding function to generate an embedding vector. Here, the encoding/decoding information is at least one of a quantization parameter, a Lagrange constant used in a rate-distortion optimization process, a temporal layer in a group of pictures (GOP), or a type of a frame. The method also includes generating a complemented residual frame by matrix multiplying the embedding vector and the first residual frame. The method also includes generating a second residual frame by inputting the complemented residual frame into a linear model. Here, the linear model includes parameters representing a linear relation between the complemented residual frame and the second residual frame. The method also includes generating an improved reconstructed frame by adding the second residual frame and the reconstructed frame.

As described above, the present disclosure provides a video coding method and an apparatus for generating a residual frame from a reconstructed frame using a deep learning model and approximating an original residual frame by applying the generated residual frame to a linear model. Thus, the video coding method and the apparatus improve video coding efficiency and video quality according to performance improvement of in-loop filter.

BRIEF DESCRIPTION OF THE DRAWINGS

FIG. 10 is a flowchart illustrating a method for improving video quality according to an embodiment of the present disclosure.

DETAILED DESCRIPTION

Figure 1:
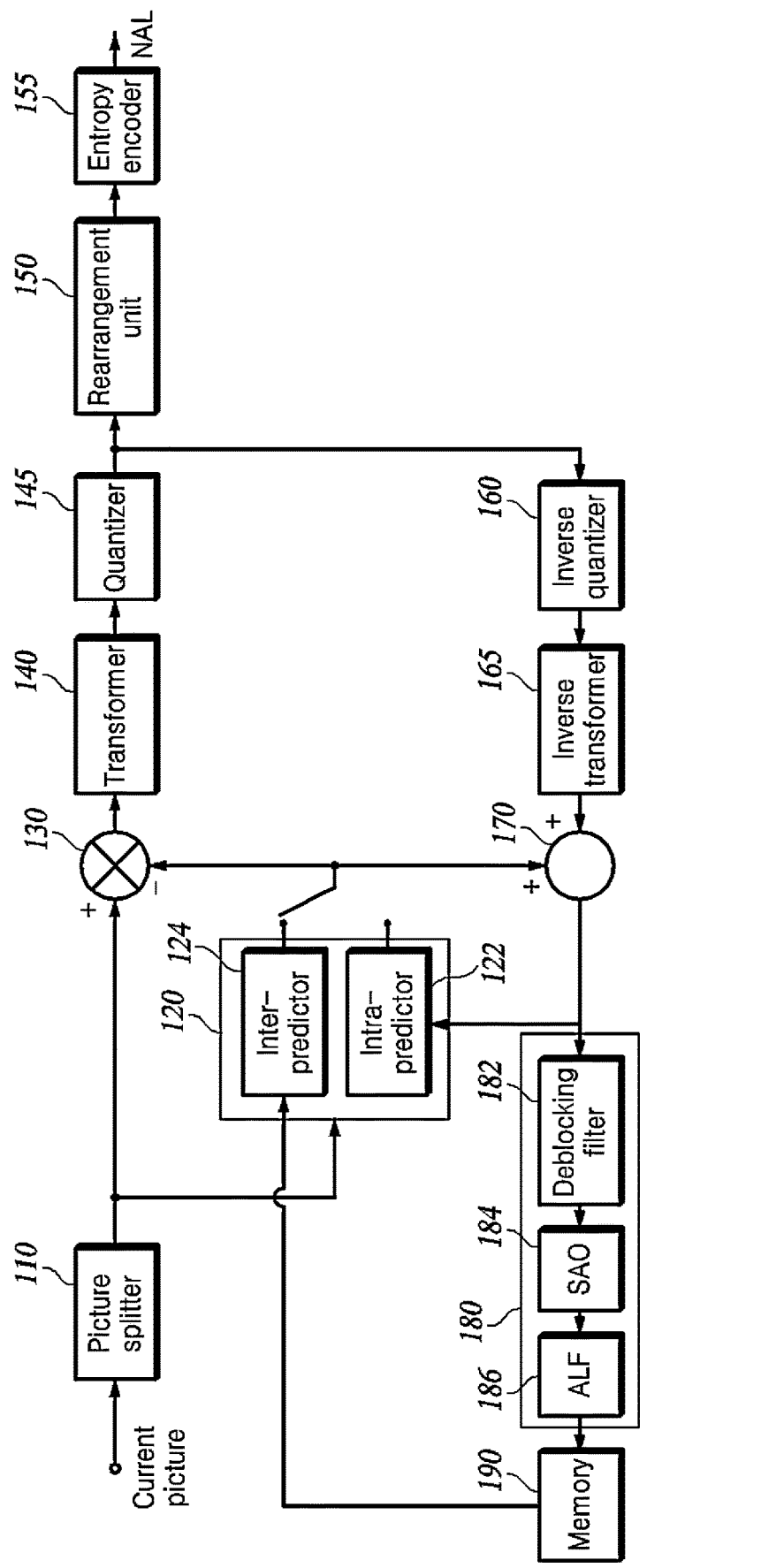
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure may be omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each coding unit (CU) is encoded as a syntax of the CU, and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a binarytree ternarytree (BTTT) is added to the tree structures to be referred to as a multiple-type tree (MTT).

Figure 2:
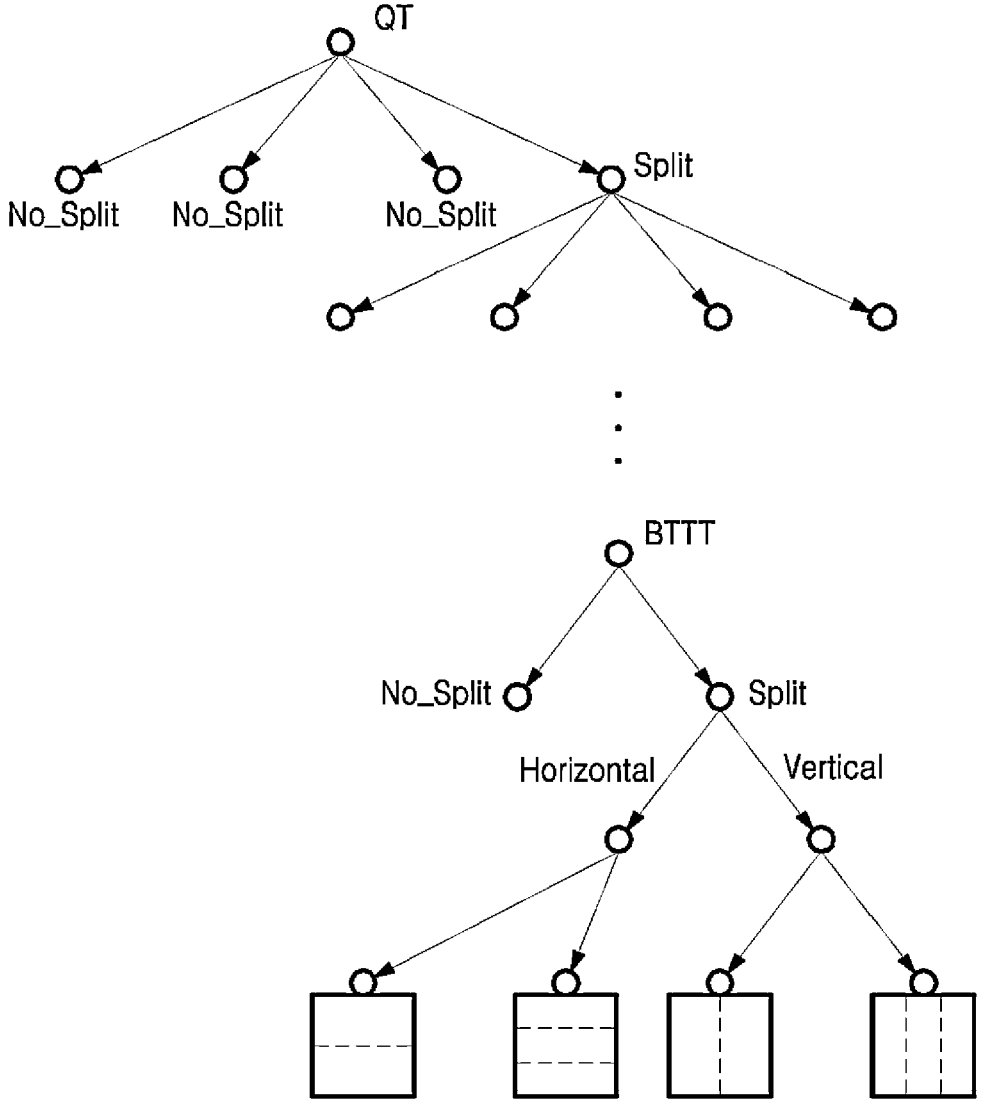
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block." As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
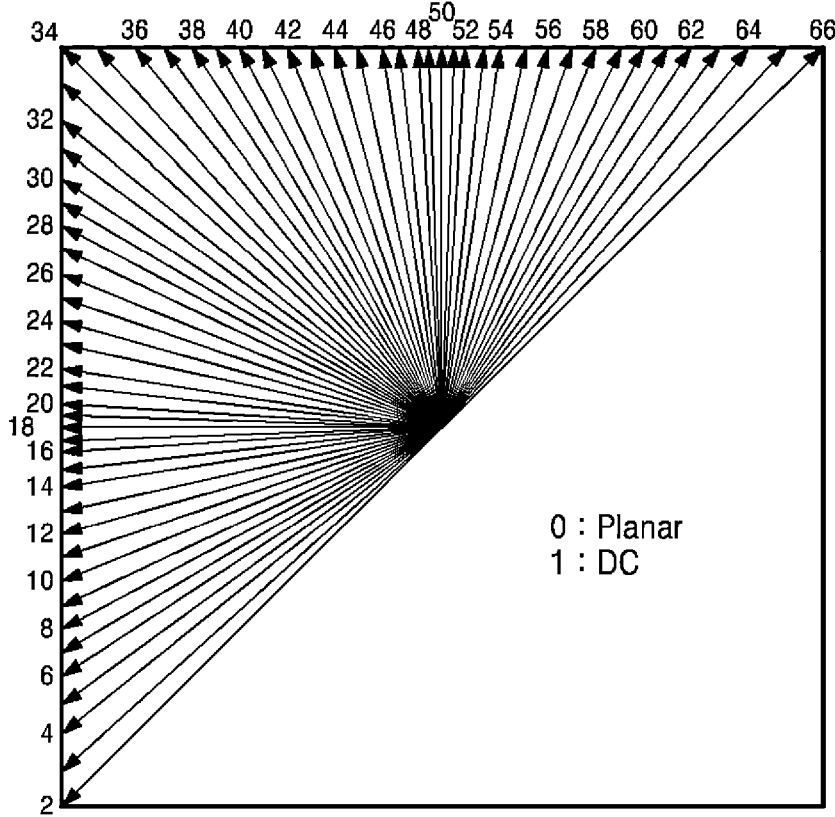
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes.

A neighboring pixel and an arithmetic equation to be used are defined differently according to each prediction mode.

Figure 3B:
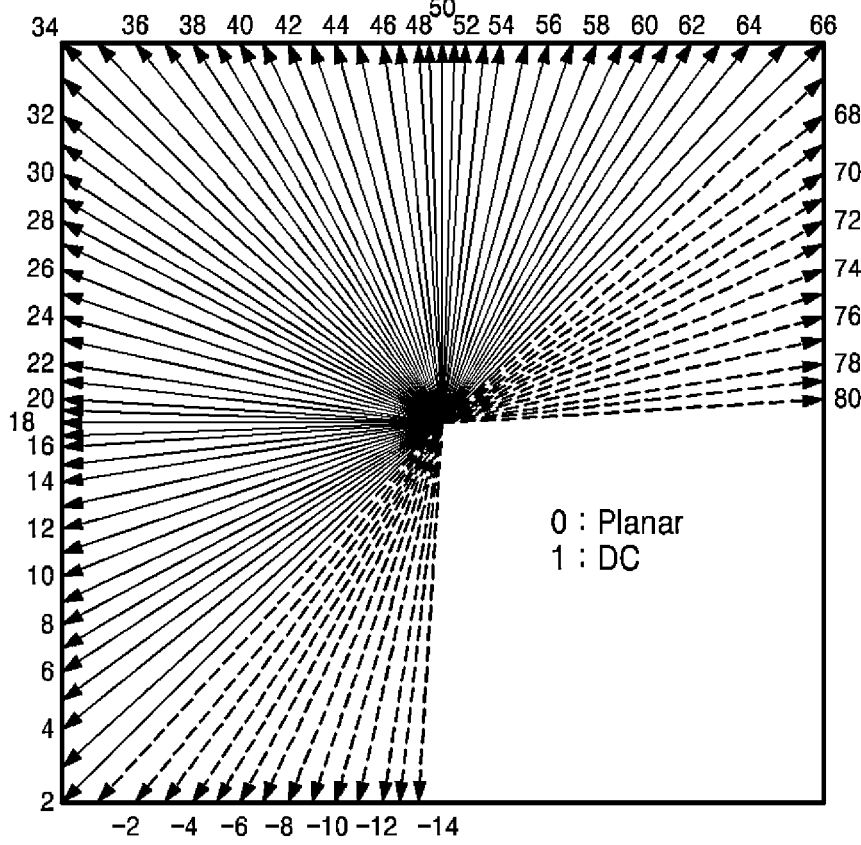

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and may also select an appropriate intra prediction mode to be used from tested modes. For example, the intra predictor 122 may calculate rate-distortion values by using a rate-distortion analysis for multiple tested intra prediction modes and may also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, and the like. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and including information on two motion vectors is delivered to the entropy encoder 155. Here, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
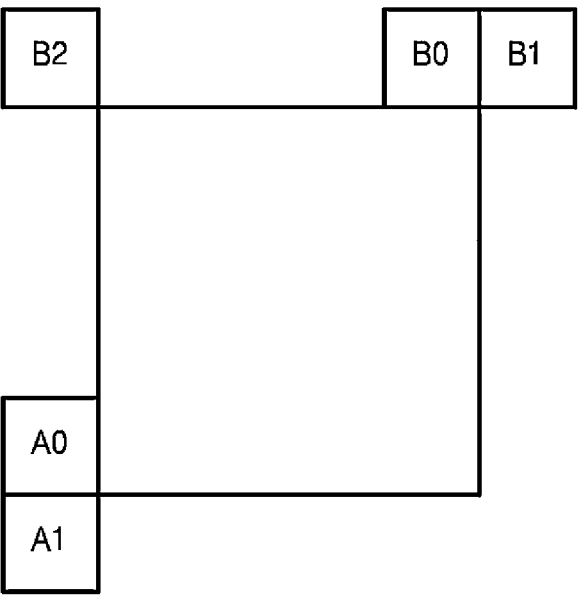
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate.

didate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, and the like) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information, such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
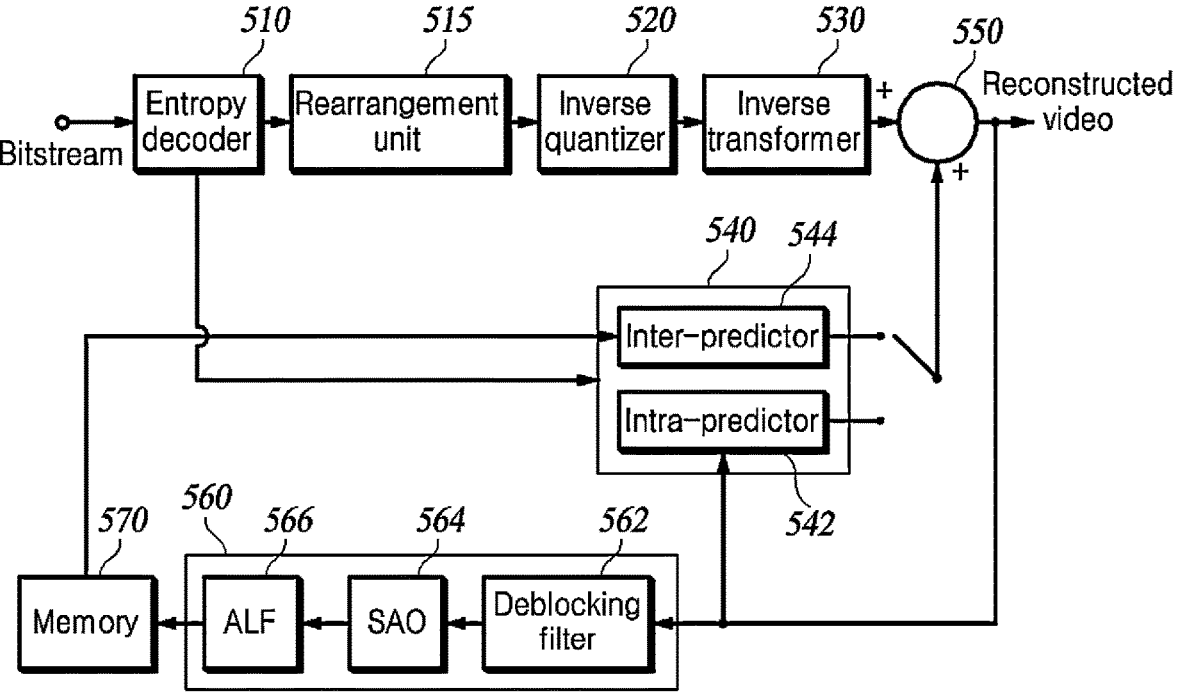
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for reconstructing the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur, or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT is further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by reconstructing the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

The present disclosure in some embodiments relates to encoding and decoding video images as described above. More specifically, the present disclosure provides a video coding method and an apparatus for generating a residual frame from a reconstructed frame using a deep learning model. The video coding method and the apparatus improve performance of an in-loop filter by approximating an original residual frame by applying the generated residual frame to a linear model.

The following embodiments may be commonly applied to the loop filter unit 180 in the video encoding apparatus and the loop filter unit 560 in the video decoding apparatus. In addition, the following embodiments may be commonly applied to parts that use deep learning technology of the video encoding apparatus and the video decoding apparatus.

In the following description, the term 'target block' to be encoded or decoded may be used in the same meaning as the current block or coding unit (CU) as described above, or the 'target block' may mean a partial region of the coding unit.

Figure 6:
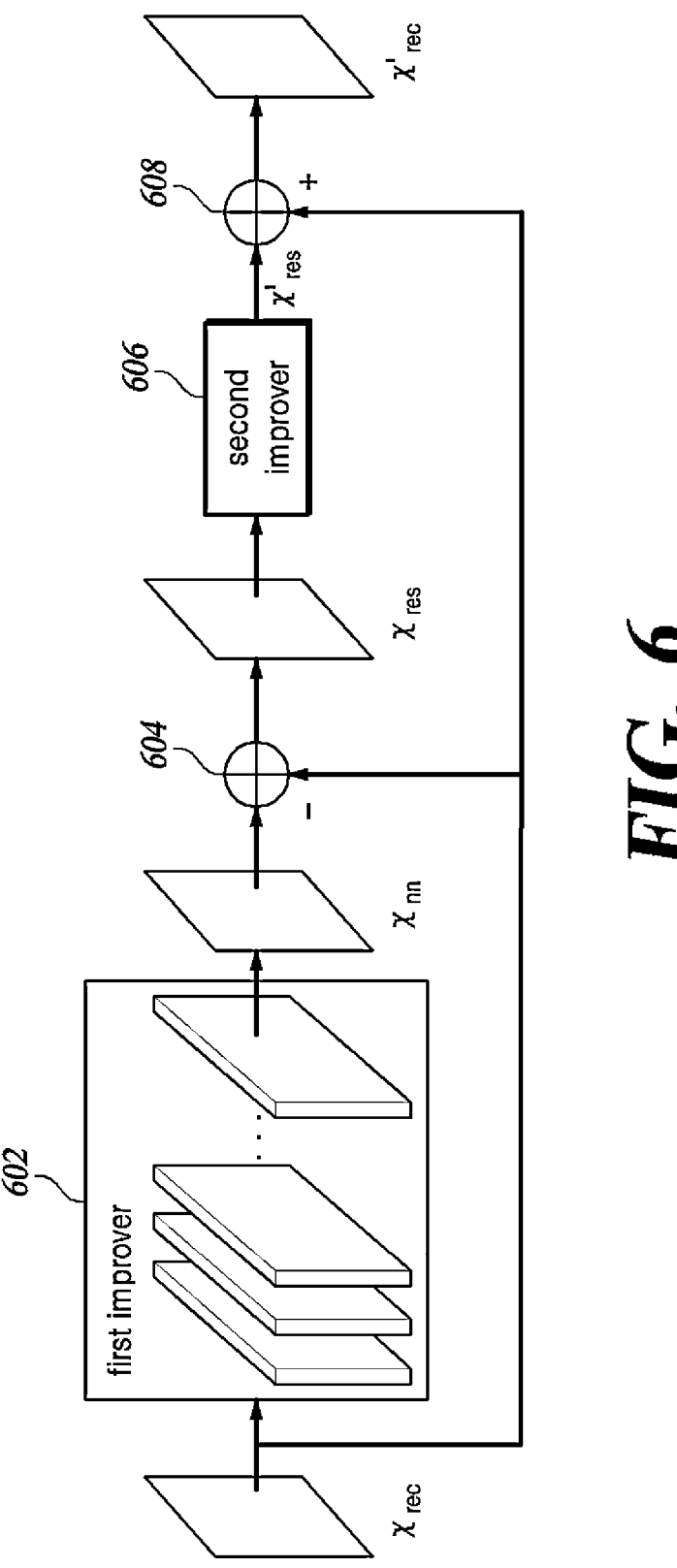
FIG. 6 is a diagram illustrating a video quality improvement device according to an embodiment of the present disclosure.

FIG. 6 is a diagram illustrating a video quality improvement device according to an embodiment of the present disclosure.

The video quality improvement device according to the present embodiment generates a residual frame from a reconstructed frame using a deep learning model, applies the generated residual frame to a linear model to approximate an original residual frame, and generates an improved reconstructed frame by using the approximated original residual frame. The video quality improvement device includes all or some of a first improver 602, a subtractor 604, a second improver 606, and an adder 608. In addition, the first improver 602 includes an improvement model that is a deep learning model, and the second improver 606 includes a linear model.

When the video quality improvement device according to the present embodiment is included in a video encoding apparatus, the components included in the video quality improvement device are not necessarily limited to the example in FIG. 6. For example, the video quality improvement device may additionally include a training unit (not shown) for training an improvement model or may be implemented in a form that is linked to an external training unit.

The first improver 602 obtains a reconstructed frame $x_{rec}[i,j]$ as input, inputs the reconstructed frame $x_{rec}[i,j]$ into an improvement model, and outputs $x_{nn}[i,j]$ obtained by approximating an original frame $x_{ori}[i,j]$. Here, [i,j] indicates a position of the pixel in the frame. The improvement model may generate an approximate output $x_{nn}$ using multiple layers. Here, the plurality of layers may be convolutional layers suitable for deep learning-based video signal processing.

The subtractor 604 subtracts the reconstructed frame $x_{rec}[i,j]$ from the approximate output $x_{nn}[i,j]$ to generate the residual frame $x_{res}[i,j]$, as shown in Equation 1.

$$x_{res}[i,j] = x_{nn}[i,j] - x_{rec}[i,j] \qquad \text{[Equation 1]}$$

Therefore, the residual frame $x_{res}$ approximates the difference between the original frame $x_{ori}$ and the reconstructed frame $x_{rec}$. Hereinafter, this difference is referred to as 'original residual frame $x_{o\_res}$'. The original residual frame $x_{o\_res}[i,j]$ may be expressed as Equation 2.

$$x_{res}[i,j] = x_{ori}[i,j] - x_{rec}[i,j] \qquad \text{[Equation 2]}$$

The second improver 606 once again approximates the original residual frame $x_{o\_res}$ from the residual frame $x_{res}$ using a linear model. When $\alpha$ and $\beta$ are the parameters representing the linear relation provided by the linear model, the linearly approximated residual frame $x'_{res}[i,j]$ may be expressed as Equation 3.

$$x'_{re}[i,j] = \alpha \cdot x_{res}[i,j] + \beta \qquad \text{[Equation 3]}$$

Hereinafter, the residual frame $x_{res}$ is used interchangeably with a 'first residual frame', and the linearly approximated residual frame $x'_{res}$ is used interchangeably with a 'second residual frame'.

The adder 608 adds the second residual frame $x'_{res}[i,j]$ and the reconstructed frame $x_{rec}[i,j]$ to generate an improved reconstructed frame $x'_{rec}[i,j]$, as shown in Equation 4.

$$x'_{rec}[i,j] = x_{rec}[i,j] + \alpha \cdot x_{res}[i,j] + \beta \qquad \text{[Equation 4]}$$

From Equation 3 and Equation 4, the second residual frame $x'_{res}[i,j]$ may be expressed as Equation 5.

$$x'_{res}[i,j] = x'_{rec}[i,j] - x_{rec}[i,j] \qquad \text{[Equation 5]}$$

Meanwhile, the training unit may train the improvement model using the original residual frame $x_{o\_res}$ as a target, so that the improvement model may learn to approximate the original frame $x_{ori}$. The training unit may update parameters included in multiple layers using a loss function as shown in Equation 6.

$$\text{Loss} = \left\| x_{res} - x_{o_{res}} \right\|^2 \qquad \text{[Equation 6]}$$
$$= \left\| x_{res} - (x_{ori} - x_{rec}) \right\|^2$$

Here, $\|\cdot\|$ represents an L2 metric. Meanwhile, as shown in Equation 6, the loss function of the improvement model is expressed as the L2 metric, but is not necessarily limited thereto. Any metric that may represent a distance between the first residual frame $x_{res}$ and the original residual frame $x_{o\_res}$ may be used as the loss function.

The parameters $\alpha$ and $\beta$ of the linear model may be calculated using the first residual frame $x_{res}[i,j]$ and the second residual frame $x'_{res}[i,j]$. At this time, since the second residual frame $x'_{res}[i,j]$ is a value that has not yet been determined or approximates the original residual frame, the original residual frame $x_{o\_res}[i,j]$ may be used instead. Using a linear least square equation, $\alpha$ and $\beta$ may be estimated as shown in Equation 7.

$$K \cdot \sum_{k=1}^{K} x_{o\_res}(k) x_{res}(k) - \quad \text{[Equation 7]}$$

$$\alpha = \frac{\sum_{k=1}^{K} x_{o\_res}(k) \cdot \sum_{k=1}^{K} x_{res}(k)}{K \cdot \sum_{k=1}^{K} x_{res}(k) x_{res}(k) - \left(\sum_{k=1}^{K} x_{res}(k)\right)^2}$$

$$\beta = \frac{\sum_{k=1}^{K} x_{o\_res}(k) - \alpha \sum_{k=1}^{K} x_{res}(k)}{K}$$

Here, K represents a total number of pixels included in the frame. In other words, to calculate $\alpha$ and $\beta$, [i,j] may be replaced by [k]. Therefore, the linear model provides a linear relation between pixels in the first residual frame $x_{res}$ and pixels in the original residual frame $x_{o\_res}$. Meanwhile, when one of $\alpha$ or $\beta$ is set to 0, a non-zero parameter may be estimated according to Equation 7. Thereafter, the second improver 606 may generate a second residual frame $x'_{res}[i,j]$ using Equation 3 including one estimated parameter.

Figure 7:
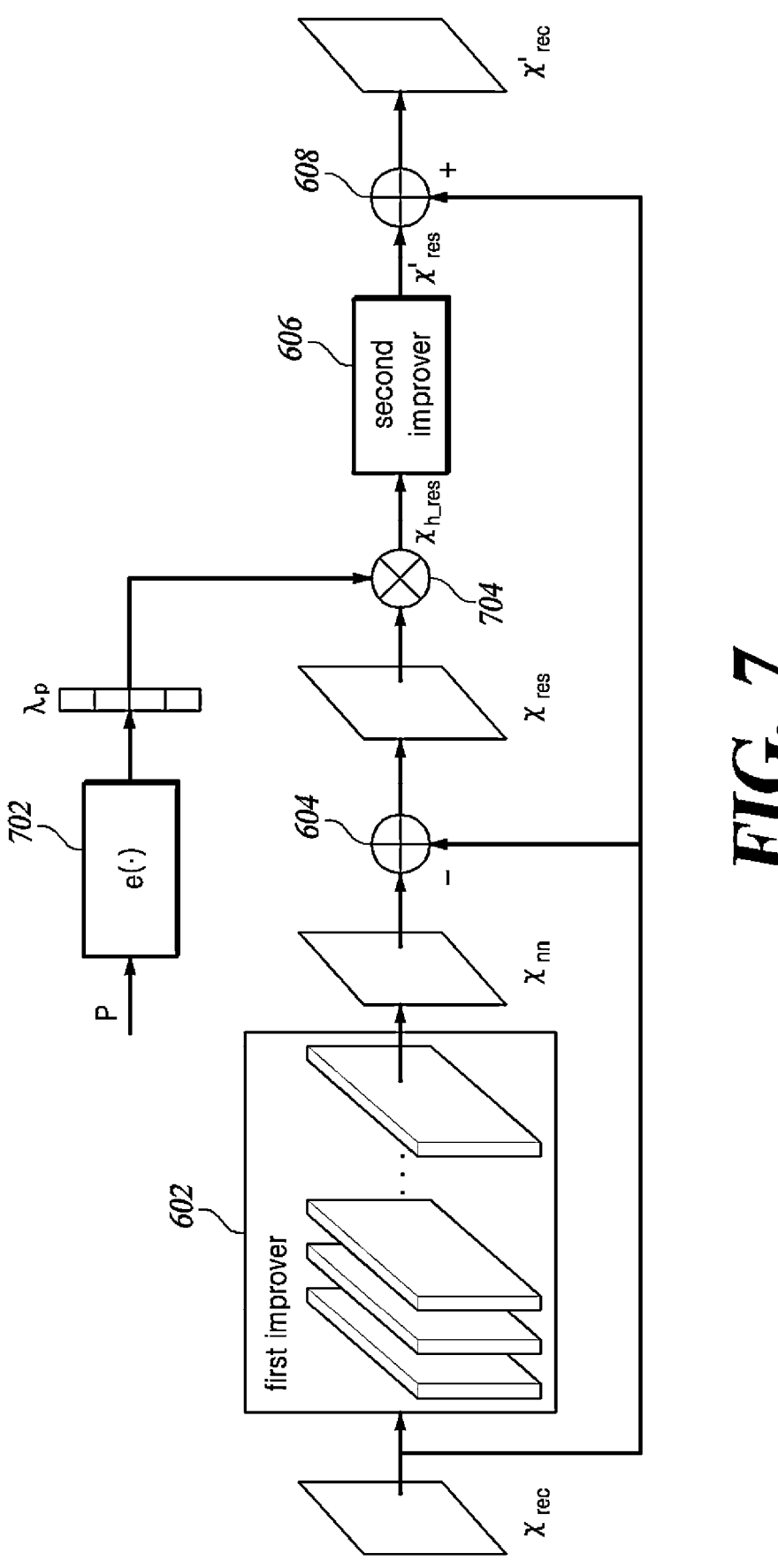
FIG. 7 is a diagram illustrating a video quality improvement device according to another embodiment of the present disclosure.

FIG. 7 is a diagram illustrating a video quality improvement device according to another embodiment of the present disclosure.

The video quality improvement device according to the present embodiment may complement the first residual frame $x_{res}$ using an embedding vector of video encoding/decoding information. The video quality improvement device may additionally include an embedding vector generator 702 and a matrix multiplier 704.

The embedding vector generator 702 generates an embedding vector $\lambda_p$ from video encoding/decoding information P using an embedding function $e(\cdot)$. Here, the embedding function is a deep learning model including a fully-connected layer or a convolutional layer.

As the encoding/decoding information P, a quantization parameter, a Lagrange constant used in a rate-distortion optimization process, a temporal layer in group of pictures (GOP), and a type of a frame (intra/predictive/bi-predictive (I/P/B)), and the like may be used. Alternatively, a combination of all or some of them may be used as encoding/decoding information P.

The matrix multiplier 704 performs matrix multiplication of the embedding vector $\lambda_P$ and the first residual frame $x_{res}$ to generate a complemented residual frame $x_{h\_res}[i,j]$ of the same size as $x_{res}$. Here, the matrix multiplication may be, for example, a component-wise multiplication between the embedding vector and the rows in the first residual frame. To this end, an embedding function may be defined such that the size of the embedding vector is equal to the size of the rows in the first residual frame. As another example, the matrix multiplication may be an component-wise multiplication between the embedding vector and the columns in the first residual frame. To this end, the embedding function may be defined such that the size of the embedding vector is equal to the size of the columns in the first residual frame.

The second improver 606 once again approximates the original residual frame $x_{o\_res}$ from the complemented residual frame $x_{h\_res}[i,j]$ using the linear model. For parameters $\alpha$ and $\beta$ representing the linear model, the linearly approximated residual frame $x'_{res}[i,j]$ may be expressed as Equation 8.

$$x_{res}[i, j] = \alpha \cdot x_{h\_res}[i, j] + \beta \quad \text{[Equation 8]}$$

At this time, the parameters $\alpha$ and $\beta$ of the linear model may be estimated as shown in Equation 9 using the original residual frame $x_{o\_res}[i,j]$ and the complemented residual frame $x_{h\_res}[i,j]$.

$$K \cdot \sum_{k=1}^{K} x_{o\_res}(k) x_{h\_res}(k) - \quad \text{[Equation 9]}$$

$$\alpha = \frac{\sum_{k=1}^{K} x_{o\_res}(k) \cdot \sum_{k=1}^{K} x_{h\_res}(k)}{K \cdot \sum_{k=1}^{K} x_{h\_res}(k) x_{h\_res}(k) - \left(\sum_{k=1}^{K} x_{h\_res}(k)\right)^2}$$

$$\beta = \frac{\sum_{k=1}^{K} x_{o\_res}(k) - \alpha \sum_{k=1}^{K} x_{h\_res}(k)}{K}$$

As an example, the video encoding apparatus may derive parameters of the linear model, encode the parameters into a bitstream, and transmit the bitstream to the video decoding apparatus. At this time, whether to apply video quality improvement may be determined at the level of frame, picture, subpicture, slice, tile, a block unit, and a pixel unit. In the case of block unit, whether to apply video quality improvement may be determined based on CTU and CU/prediction unit (PU). Alternatively, whether to apply video quality improvement may be determined based on the size of a sub-CU. Whether to apply video quality improvement may be determined based on the size of a tile or subpicture, as a set of blocks.

As another example, the video encoding apparatus may signal whether to improve video quality to the video decoding apparatus using a flag. The video encoding apparatus may receive this flag from a high level, and the video decoding apparatus may obtain the flag by decoding the bitstream. Meanwhile, if the method of encoding parameter information regardless of the application unit is more damaging in terms of rate-distortion than the existing method of transmitting only the reconstructed signal, the video quality improvement method may not be applied depending on the flag value.

As another example, in addition to the method of transmitting parameter values of a linear model for all application units, parameter values according to video encoding/decoding information may be statistically utilized. For example, when the quantization parameter is 22, parameter values of the frequently occurring linear model may be calculated in advance, and then the parameter values may be set in advance using the calculated values. Alternatively, a lookup table may be generated based on statistics of parameter values according to encoding/decoding information and then used. At this time, one or more lookup tables may be generated depending on the quantization parameter value, frame type, temporal identifier (temporal ID) within the GOP, size of the applied block, intra/inter coding of the block, and the like and then may be used when applying the video quality improvement method.

As another example, a plurality of ($\alpha$,$\beta$) pairs and corresponding indices may be set in advance based on the statistics of parameter values according to encoding/decoding information. The video encoding apparatus signals an index, and the video decoding apparatus may obtain predefined $\alpha$ and $\beta$ using the index. At this time, when either $\alpha$ or $\beta$ is fixed to 0, the index may be signaled for a parameter value other than 0.

Meanwhile, the video quality improvement device may be a filter included in the loop filter unit 180 in the video encoding apparatus or the loop filter unit 560 in the video decoding apparatus. Therefore, the reconstructed frame $x_{rec}$ is a frame obtained by reconstructing the original frame, and any frame previously reconstructed by the video encoding apparatus or the video decoding apparatus may be used. For example, the reconstructed frame $x_{rec}$ may be one of signals stored in a decoded picture buffer (DPB) in the memory 190 or 570, an output of the deblocking filter 182 or 562, an output of the SAO filter 184 or 564, an output of a bilateral filter (BF), or an output of the ALF 186 or 566. Here, BF is one of the in-loop filters and may be applied to improve the video quality of the reconstructed frame. In addition, the signals stored in the DPB are defined as the output of the adders 170 and 550, i.e., the reconstructed signals corresponding to the sum of the predicted signals and the inversely transformed signals. Meanwhile, the DBP may store reconstructed pictures generated by passing all in-loop filters, as illustrated in FIGS. 1 and 5.

As another example, in addition to the in-loop filter, $x_{rec}$ may be an inter predicted signals or an intra predicted signals. Improvement of the predicted signals, improvement of video quality after compression, and the like may be performed by the video quality improvement method according to the present embodiment.

In the example of FIGS. 6 and 7, $x_{nn}$ according to Equation 1 is the output of the improvement model, which is a deep learning model. However, when the deep learning model is not used, $x_{nn}$ is one of the output of the deblocking filter 182 or 562, the output of the SAO filter 184 or 564, the output of the bilateral filter, or the output of the ALF 186 or 566.

Figure 8:
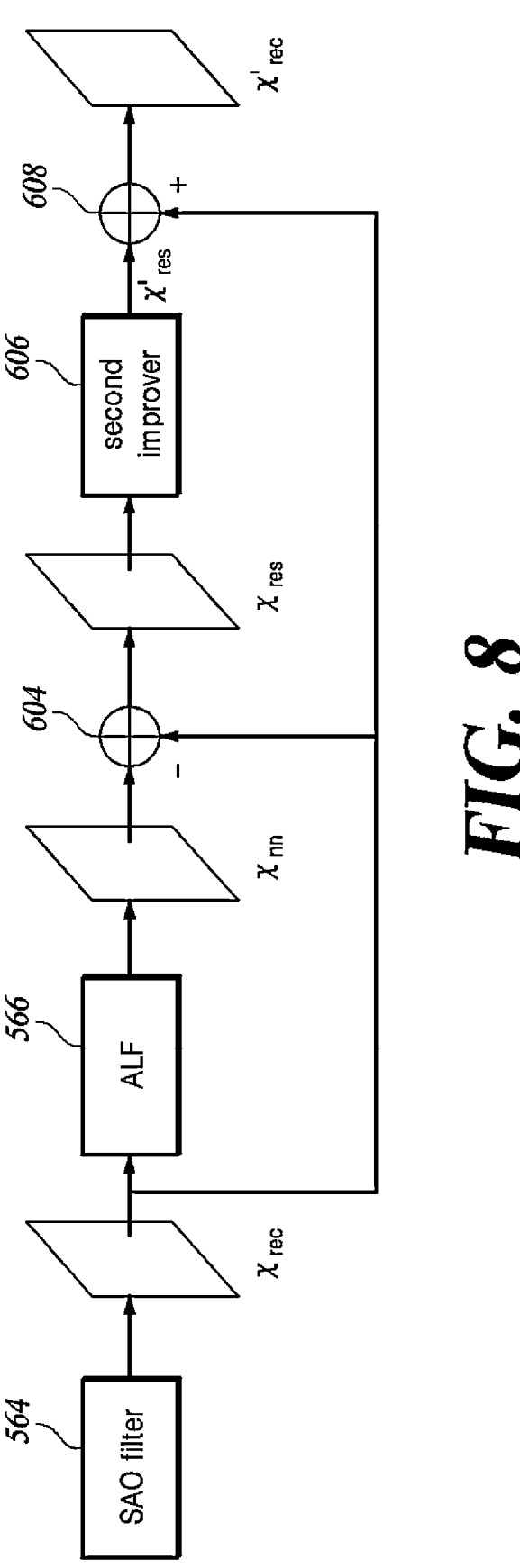
FIG. 8 is a diagram illustrating a video quality improvement device according to another embodiment of the present disclosure.

FIG. 8 is a diagram illustrating a video quality improvement device according to another embodiment of the present disclosure.

For example, as illustrated in FIG. 8, $x_{rec}$ may be used as the output of the SAO 564 and the input of the ALF 566, and $x_{nn}$ may be used as the output of the ALF 566. Hereafter, $x_{nn}$ may be used to generate the reconstruction signal $x'_{rec}$. The video quality improvement device illustrated in FIG. 8 is configured based on in-loop filters in the video decoding apparatus but is not limited thereto. For example, the video quality improvement device may be similarly configured based on in-loop filters in the video encoding apparatus.

Hereinafter, a method of improving video quality using a linear model is described using FIGS. 9 and 10.

Figure 9:
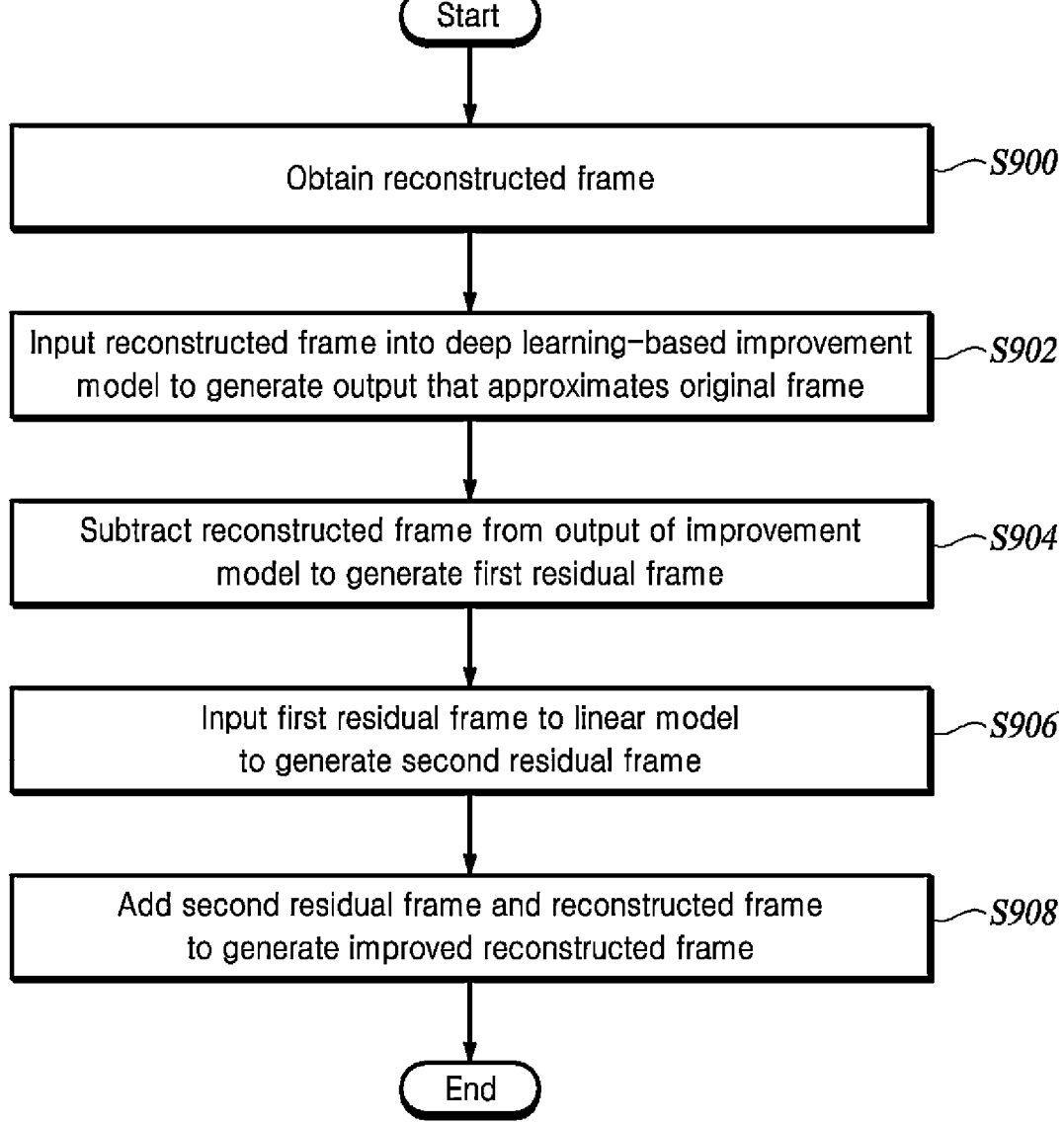
FIG. 9 is a flowchart illustrating a method for improving video quality according to an embodiment of the present disclosure.

FIG. 9 is a flowchart illustrating a method for improving video quality according to an embodiment of the present disclosure.

The video quality improvement device obtains a reconstructed frame (S900).

The video quality improvement device inputs the reconstructed frame into a deep learning-based improvement model and generates an output that approximates the original frame (S902). Here, the reconstructed frame is a frame obtained by reconstructing the original frame, and is reconstructed in advance by the video encoding apparatus or the video decoding apparatus. For example, the reconstructed frame may be one of signals stored in the DPB in the memory 190 or 570, the output of the deblocking filter 182 or 562, the output of the SAO filter 184 or 564, the output of BF, or the output of the ALF 186 or 566.

The video quality improvement device generates a first residual frame by subtracting the reconstructed frame from the output of the improvement model (S904). The first residual frame approximates the original residual frame, and the original residual frame is a difference between the original frame and the reconstructed frame.

The improvement model is a deep learning model that includes multiple layers and is trained to learn to approximate the original frame. The improvement model may be trained using a loss function based on the difference between the first residual frame and the original residual frame, as shown in Equation 6.

The video quality improvement device inputs the first residual frame into the linear model to generate a second residual frame (S906). Here, the linear model includes parameters a and B representing a linear relation between the first residual frame and the second residual frame.

The parameters of the linear model may be calculated using the first residual frame and the second residual frame. At this time, the second residual frame is a value that has not yet been determined, but since it approximates the original residual frame, the original residual frame may be used instead. The parameters of the linear model may be calculated as shown in Equation 7 using the linear least square equation. The linear model may provide a linear relation between pixel values in the first residual frame and pixel values in the original residual frame.

The video quality improvement device adds the second residual frame and the reconstructed frame to generate an improved reconstructed frame (S908).

FIG. 10 is a flowchart illustrating a method for improving video quality according to an embodiment of the present disclosure.

The video quality improvement device obtains a reconstructed frame (S1000).

The video quality improvement device inputs the reconstructed frame into a deep learning-based improvement model and generates an output that approximates the original frame (S1002). Here, the reconstructed frame is a frame obtained by reconstructing the original frame and is reconstructed in advance by the video encoding apparatus or the video decoding apparatus.

The video quality improvement device generates a first residual frame by subtracting the reconstructed frame from the output of the improvement model (S1004).

The video quality improvement device obtains encoding/decoding information (S1006). Here, a quantization parameter, a Lagrange constant used in a rate-distortion optimization process, a temporal layer within GOP, a type of a frame (I/P/B), and the like may be used as encoding/decoding information. Alternatively, a combination of all or some of them may be used as the encoding/decoding information.

The video quality improvement device generates an embedding vector by inputting the encoding/decoding information into a deep learning-based embedding function (S1008). The embedding function is a deep learning model including fully connected layers or convolutional layers.

The video quality improvement device performs matrix multiplication of the embedding vector and the first residual frame to generate a complemented residual frame (S1010). Here, the matrix multiplication may be, for example, an component-wise multiplication between the embedding vector and the rows in the first residual frame. As another example, the matrix multiplication may be an component-wise multiplication between the embedding vector and the columns in the first residual frame, The video quality improvement device generates a second residual frame by inputting the complemented residual frame into the linear model (S1012). Here, the linear model includes parameters $\alpha$ and $\beta$ representing a linear relation between the complemented residual frame and the second residual frame. The parameters of the linear model may be calculated as shown in Equation 9 using the original residual frame and the complemented residual frame.

The video quality improvement device generates an improved reconstructed frame by adding the second residual frame and the reconstructed frame (S1014).

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in the present disclosure are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which the present disclosure pertains should understand that the scope of the present disclosure should not be limited by the above explicitly described embodiments but by the claims and equivalents thereof.

REFERENCE NUMERALS

180: loop filter unit
560: loop filter unit
602: first improver
606: second improver
702: embedding vector generator

What is claimed is:

1. A method for improving video quality of a reconstructed frame, performed by a video encoding apparatus, the method comprising:
   encoding an original frame into a bitstream and generating a reconstructed frame of the original frame;
   inputting the reconstructed frame into a deep learning-based improvement model to generate an output;
   generating a first residual frame based on the output of the deep learning-based improvement model;
   inputting the first residual frame into a linear model to generate a second residual frame, wherein the linear model includes parameters representing a linear relation between the first residual frame and the second residual frame; and generating an improved reconstructed frame for the reconstructed frame by adding the second residual frame and the reconstructed frame.

2. The method of claim 1, wherein the first residual frame approximates an original residual frame, and
   wherein the original residual frame is a difference between the original frame and the reconstructed frame.

3. The method of claim 2, wherein the deep learning-based improvement model is a deep learning model including multiple layers and is trained using a loss function based on a difference between the first residual frame and the original residual frame.

4. The method of claim 1, wherein the reconstructed frame is one of reconstructed signals stored in a decoded picture buffer (DPB), an output of a deblocking filter, an output of a sample adaptive offset (SAO) filter, or an output of an adaptive loop filter (ALF), and
   wherein the reconstructed signals are a sum of predicted signals and inversely transformed signals.

5. The method of claim 1, further comprising:
   signaling a flag indicating whether to apply the method of improving video quality.

6. The method of claim 2, further comprising:
   estimating the parameters of the linear model by using a linear least square equation based on pixel values in the first residual frame and pixel values in the original residual frame.

7. The method of claim 1, further comprising:
   deriving the parameters of the linear model; and
   encoding the parameters of the linear model into the bitstream to transmit the parameters of the linear model to a video decoding apparatus.

8. The method of claim 1, further comprising:
   using preset values as the parameters of the linear model, wherein the preset values are statistically frequently occurring values based on encoding and decoding information.

9. The method of claim 1, further comprising:
   signaling an index indicating parameter values of the linear model to a video decoding apparatus, wherein the parameter values of the linear model and corresponding indices are set in advance.

10. A method for improving video quality of a reconstructed frame, performed by a video decoding apparatus, the method comprising:
    generating a reconstructed frame of an original frame from a bitstream;
    inputting the reconstructed frame into a deep learning-based improvement model to generate an output;
    generating a first residual frame based on the output of the deep learning-based improvement model;
    inputting the first residual frame into a linear model to generate a second residual frame, wherein the linear model includes parameters representing a linear relation between the first residual frame and the second residual frame; and
    generating an improved reconstructed frame for the reconstructed frame by adding the second residual frame and the reconstructed frame.

11. The method of claim 10, wherein the first residual frame approximates an original residual frame, and
    wherein the original residual frame is a difference between the original frame and the reconstructed frame.

12. The method of claim 11, wherein the deep learning-based improvement model is a deep learning model including multiple layers and is trained using a loss function based on a difference between the first residual frame and the original residual frame.

13. The method of claim 11, further comprising:
estimating the parameters of the linear model by using a linear least square equation based on pixel values in the first residual frame and pixel values in the original residual frame.

14. The method of claim 10, wherein the reconstructed frame is one of reconstructed signals stored in a decoded picture buffer (DPB), an output of a deblocking filter, an output of a sample adaptive offset (SAO) filter, or an output of an adaptive loop filter (ALF), and
wherein the reconstructed signals are a sum of predicted signals and inversely transformed signals.

15. The method of claim 10, further comprising:
decoding a flag indicating whether to apply the method of improving video quality.

16. The method of claim 10, further comprising:
decoding the parameters of the linear model from the bitstream.

17. The method of claim 10, further comprising:
using preset values as the parameters of the linear model, wherein the preset values are statistically frequently occurring values based on encoding and decoding information.

18. The method of claim 10, further comprising:
decoding an index indicating parameter values of the linear model from a bitstream, wherein the parameter values of the linear model and corresponding indices are set in advance.

19. A method for providing a video decoding apparatus with video data, the method comprising:
encoding the video data into a bitstream; and
transmitting the bitstream to the video decoding device, wherein the encoding of the video data comprises:
encoding an original frame into a bitstream and generating a reconstructed frame of the original frame;
inputting the reconstructed frame into a deep learning-based improvement model to generate an output;
generating a first residual frame based on the output of the deep learning-based improvement model;
inputting the first residual frame into a linear model to generate a second residual frame, wherein the linear model includes parameters representing a linear relation between the first residual frame and the second residual frame; and
generating an improved reconstructed frame for the reconstructed frame by adding the second residual frame and the reconstructed frame.

* * * * *